United States Patent
Furar et al.

(10) Patent No.: US 12,384,135 B2
(45) Date of Patent: Aug. 12, 2025

(54) CURABLE FILM-FORMING COMPOSITIONS CONTAINING LITHIUM SILICATES AS CORROSION INHIBITORS AND MULTILAYER COATED METAL SUBSTRATES

(71) Applicant: PRC-DeSoto International, Inc., Sylmar, CA (US)

(72) Inventors: Elizabeth A. Furar, Pittsburgh, PA (US); Michael A. Mayo, Pittsburgh, PA (US); Eric L. Morris, Murrieta, CA (US); Tommy G. Bunten, Fountain Valley, CA (US)

(73) Assignee: PRC-DESOTO INTERNATIONAL, INC., Slymar (CA)

( * ) Notice: Subject to any disclaimer, the term of this patent is extended or adjusted under 35 U.S.C. 154(b) by 933 days.

(21) Appl. No.: 15/578,157

(22) PCT Filed: May 27, 2016

(86) PCT No.: PCT/US2016/034544
§ 371 (c)(1),
(2) Date: Nov. 29, 2017

(87) PCT Pub. No.: WO2016/196252
PCT Pub. Date: Dec. 8, 2016

(65) Prior Publication Data
US 2018/0162099 A1 Jun. 14, 2018

Related U.S. Application Data

(60) Provisional application No. 62/168,170, filed on May 29, 2015.

(51) Int. Cl.
| | |
|---|---|
| *C09D 5/00* | (2006.01) |
| *B32B 15/08* | (2006.01) |
| *C01B 33/32* | (2006.01) |
| *C08L 27/12* | (2006.01) |
| *C08L 75/04* | (2006.01) |
| *C09D 5/08* | (2006.01) |
| *C08L 87/00* | (2006.01) |

(52) U.S. Cl.
CPC ............ *B32B 15/08* (2013.01); *C01B 33/32* (2013.01); *C08L 27/12* (2013.01); *C08L 75/04* (2013.01); *C09D 5/00* (2013.01); *B32B 2264/102* (2013.01); *C08L 87/00* (2013.01); *C08L 2203/16* (2013.01)

(58) Field of Classification Search
CPC .................. C09D 5/00; C01B 33/32
See application file for complete search history.

(56) References Cited

U.S. PATENT DOCUMENTS

| | | | |
|---|---|---|---|
| 4,219,358 A | 8/1980 | Hayashi et al. | |
| 6,235,348 B1* | 5/2001 | Shimizu | C09D 179/02 427/388.1 |
| 6,464,774 B1 | 10/2002 | Satoh | |
| 6,478,886 B1 | 11/2002 | Kunz et al. | |
| 2010/0151257 A1 | 6/2010 | Suzuki et al. | |
| 2011/0269660 A1* | 11/2011 | Miralles | C11D 3/0073 510/219 |
| 2011/0294921 A1 | 12/2011 | Smith | |
| 2012/0025142 A1 | 2/2012 | Visser et al. | |
| 2015/0044450 A1* | 2/2015 | Yuasa | C09D 7/61 428/335 |
| 2015/0072161 A1 | 3/2015 | Mayo et al. | |

FOREIGN PATENT DOCUMENTS

| | | | |
|---|---|---|---|
| CN | 101155881 | 4/2008 | |
| CN | 101760749 | 6/2010 | |
| CN | 101978005 | 2/2011 | |
| CN | 102344738 A * | 2/2012 | |
| EP | 0924715 A2 * | 6/1999 | |
| EP | 2823959 A1 | 1/2015 | |
| JP | H09323376 | 12/1997 | |
| JP | 2008274419 A * | 11/2008 | |
| RU | 2201473 C2 | 3/2003 | |
| WO | 2002038686 | 5/2002 | |
| WO | 2002085541 A2 | 10/2002 | |
| WO | WO-2010112605 A1 * | 10/2010 | ............ C09D 5/084 |
| WO | WO-2013133284 A1 * | 9/2013 | ......... B23K 35/0255 |
| WO | 2014151533 A1 | 9/2014 | |
| WO | 2014151570 | 9/2014 | |

OTHER PUBLICATIONS

Machine translation into English of JP-2008274419-A; Matsuda et al (Year: 2008).*

(Continued)

*Primary Examiner* — Karuna P Reddy

(57) ABSTRACT

A curable film-forming composition is provided, comprising: (1) a curable, organic film-forming binder component; and (2) a corrosion inhibiting component comprising a lithium silicate, present in the curable film-forming composition in an amount of 0.1 to 4.5 percent lithium by weight. Also provided are coated metal substrates, including multilayer coated metal substrates, comprising the above composition. Also provided is a multilayer coated metal substrate comprising: (a) a metal substrate; (b) a first curable film-forming composition applied to said metal substrate; and (c) a second curable film-forming composition applied on top of at least a portion of the first curable film-forming composition. The first and second curable film-forming compositions in dependently comprise: (1) a curable, organic film-forming binder component; and (2) a corrosion inhibiting component comprising lithium silicate, magnesium oxide and/or an azole.

22 Claims, No Drawings

(56) References Cited

OTHER PUBLICATIONS

Machine traslation into English of CN-102344738-A; Yunqi et al (Year: 2012).*

* cited by examiner

CURABLE FILM-FORMING COMPOSITIONS CONTAINING LITHIUM SILICATES AS CORROSION INHIBITORS AND MULTILAYER COATED METAL SUBSTRATES

FIELD OF THE INVENTION

The present invention relates to curable film-forming compositions that comprise lithium silicate. The present invention also relates to substrates at least partially coated with a coating deposited from such a composition and multi-layer composite coatings, wherein at least two coating layers are deposited from a coating composition comprising a corrosion inhibiting component.

BACKGROUND OF THE INVENTION

Coatings are applied to appliances, automobiles, aircraft, and the like for a number of reasons, most notably for aesthetic reasons, corrosion protection and/or enhanced performance such as durability and protection from physical damage. To improve the corrosion resistance of a metal substrate, corrosion inhibitors are typically used in the coatings applied to the substrate. However, evolving government regulations in view of health and environmental concerns have led to the phasing out of certain corrosion inhibitors and other additives in coating compositions, making the production of effective coating compositions challenging.

It would be desirable to provide suitable curable film-forming compositions which demonstrates enhanced corrosion resistance using alternative corrosion inhibitors.

SUMMARY OF THE INVENTION

The present invention provides a curable film-forming, or coating, composition comprising:
(1) a curable, organic film-forming binder component; and
(2) a corrosion inhibiting component comprising a lithium silicate, present in the curable film-forming composition in an amount of 0.1 to 4.5 percent lithium by weight, based on the total weight of resin solids in the curable film-forming composition.

Additionally provided is a metal substrate at least partially coated with the curable film-forming composition described above.

Also provided is a multilayer coated metal substrate comprising:
(a) a metal substrate;
(b) the curable film-forming composition described above applied to said metal substrate; and
(c) an additional coating layer applied on top of at least a portion of the curable film-forming composition.

Also provided is a multilayer coated metal substrate comprising:
(a) a metal substrate;
(b) a first curable film-forming composition applied to said metal substrate, wherein the first curable film-forming composition comprises:
(1) a curable, organic film-forming binder component; and
(2) a corrosion inhibiting component; and
(c) a second curable film-forming composition applied on top of at least a portion of the first curable film-forming composition. The second curable film-forming composition comprises:
(1) a curable, organic film-forming binder component that is the same as or different from the curable, organic film-forming binder component in the first curable film-forming composition; and
(2) a corrosion inhibiting component that is the same as or different from the corrosion inhibiting component in the first curable film-forming composition; and wherein the corrosion inhibiting component (2) in each of the first and second curable film-forming compositions independently comprises (i) a lithium compound comprising lithium silicate and/or a lithium salt; (ii) magnesium oxide and/or (iii) an azole.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "a" lithium silicate, a plurality, including a mixture of such silicates can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

As used herein, the term "polymer" is meant to refer to prepolymers, oligomers and both homopolymers and copolymers; the prefix "poly" refers to two or more.

Also for molecular weights, whether number average ($M_n$) or weight average ($M_w$), these quantities are determined by gel permeation chromatography using polystyrene as standards as is well known to those skilled in the art and such as is discussed in U.S. Pat. No. 4,739,019, at column 4, lines 2-45.

As used herein "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents.

The curable film-forming compositions of the present invention may be solventborne or waterborne. The curable compositions comprise (1) a curable organic film-forming binder component. In turn, the organic film-forming binder component (1) will typically comprise (a) a resin component comprising reactive functional groups; and (b) a curing agent component comprising functional groups that are reactive with the functional groups in the resin component (a), although the film-forming binder component may also crosslink with itself rather than an additional curing agent (i.e. self-crosslinking).

The resin component (a) used in the organic film-forming binder component (1) of the curable film-forming compositions of the present invention may be selected from one or more of acrylic polymers, polyesters, polyurethanes, polyamides, polyethers, polythioethers, polythioesters, polythiols, polyenes, polyols, polysilanes, polysiloxanes, fluoropolymers, polycarbonates, and epoxy resins. Generally these compounds, which need not be polymeric, can be made by any method known to those skilled in the art. The functional groups on the film-forming binder may be selected from at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, acrylate, maleic and mercaptan groups. The functional groups on the film-forming binder are selected so as to be reactive with those on the curing agent (b) or to be self-crosslinking.

Suitable acrylic compounds include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl)phenyl glycidyl ether. Particular glycidyl esters include those of the structure:

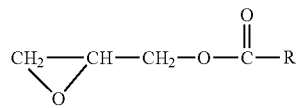

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the resin component (a) in the film-forming binder component (1) of the curable film-forming composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the resin component (a) in the film-forming binder component (1) of the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

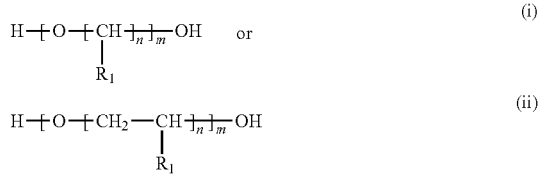

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from Invista, and POLYMEG, available from Lyondell Chemical Co.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups. Examples of suitable amine functional polyethers include those sold under the name JEFFAMINE, such as JEFFAMINE D2000, a polyether functional diamine available from Huntsman Corporation.

Suitable epoxy functional polymers for use as the resin component (a) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as any of those disclosed above. The present invention may comprise epoxy resins such as diglycidyl ethers of Bisphenol A, Bisphenol F, glycerol, novolacs, and the like. Exemplary suitable polyepoxides are described in U.S. Pat. No. 4,681,811 at column 5, lines 33 to 58, the cited portion of which is incorporated by reference herein.

Epoxy functional film-forming polymers may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins. Epoxide functional groups may be incorporated into a resin by reacting hydroxyl groups on the resin with an epihalohydrin or dihalohydrin such as epichlorohydrin or dichlorohydrin in the presence of alkali.

Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minnesota under the name FLUORAD; and perfluorinated hydroxyl functional (meth) acrylate resins.

Suitable curing agents (b) for use in the film-forming binder component (1) of the curable film-forming compositions of the present invention include aminoplasts, polyisocyanates, including blocked isocyanates, polyepoxides, beta-hydroxyalkylamides, polyacids, organometallic acid-functional materials, polyamines, polyamides, polysulfides, polythiols, polyenes such as polyacrylates, polyols, polysilanes and mixtures of any of the foregoing, and include those known in the art for any of these materials. The terms "curing agent" "crosslinking agent" and "crosslinker" are herein used interchangeably.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Allnex, under the trademark CYMEL® and from INEOS under the trademark RESIMENE®.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

Beta-hydroxyalkylamides are suitable curing agents for polymers having carboxylic acid groups. The beta-hydroxyalkylamides can be depicted structurally as follows:

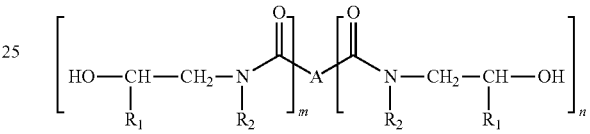

wherein $R_1$ is H or $C_1$ to $C_5$ alkyl; $R_2$ is H, $C_1$ to $C_5$ alkyl, or:

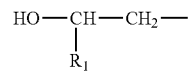

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, TX) under the designation of JEFFLINK™ such as JEFFLINK™ 754. Additional aliphatic cyclic polyamines may also be used, such as DESMOPHEN NH 1520 available from Bayer MaterialScience and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Air Products and Chemicals, Inc.

Suitable polyamides include any of those known in the art. For example, ANCAMINE polyamides, available from Air Products and Chemicals, Inc.

Suitable polyenes may include those that are represented by the formula:

A-(X)$_m$ wherein A is an organic moiety, X is an olefinically unsaturated moiety and m is at least 2, typically 2 to 6. Examples of X are groups of the following structure:

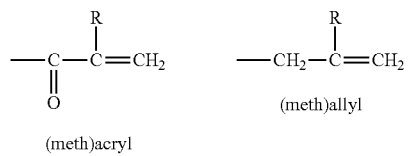

(meth)acryl    (meth)allyl wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is often around 200 to 10,000. The molecule often contains on average 2 to 20 olefinic double bonds that are polymerizable by exposure to radiation. Aliphatic and/or cycloaliphatic (meth)acrylates in each case are often used. (Cyclo)aliphatic polyurethane (meth)acrylates and (cyclo)aliphatic polyester (meth)acrylates are particularly suitable. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth)acrylic acid or anhydride with polyols, such as diols, triols and tetrols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth)acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth)allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include materials of the formula:

wherein R$^1$ is a polyvalent organic moiety and n is an integer of at least 2, typically 2 to 6.

Non-limiting examples of suitable polythiols include esters of thiol-containing acids of the formula HS—R$^2$—COOH wherein R$^2$ is an organic moiety with polyhydroxy compounds of the structure R$^3$—(OH)$_n$ wherein R$^3$ is an organic moiety and n is at least 2, typically 2 to 6. These components can be reacted under suitable conditions to give polythiols having the general structure:

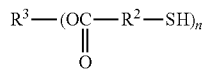

wherein R$^2$, R$^3$ and n are as defined above.

Examples of thiol-containing acids are thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetrols, pentaols, hexaols, and mixtures thereof. Other non-limiting examples of suitable polythiols include ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Suitable polyacids and polyols useful as curing agents include any of those known in the art, such as those described herein for the making of polyesters.

Appropriate mixtures of crosslinking agents may also be used in the invention. The amount of the crosslinking agent in the curable film-forming composition generally ranges from 5 to 75 percent by weight based on the total weight of resin solids in the curable film-forming composition. For example, the minimum amount of crosslinking agent may be at least 5 percent by weight, often at least 10 percent by weight and more often, at least 15 percent by weight. The maximum amount of crosslinking agent may be 75 percent by weight, more often 60 percent by weight, or 50 percent by weight. Ranges of crosslinking agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The resin component (a) may comprise epoxide functional groups and the curing agent component (b) may comprise amine functional groups.

The composition of the present invention further comprises (2) a corrosion inhibiting component comprising a lithium silicate, including lithium orthosilicate (Li$_4$SiO$_4$) and/or lithium metasilicate (Li$_2$SiO$_3$). The corrosion inhibiting component (2) may further comprise at least one of magnesium oxide (MgO) and an azole.

Any MgO of any number average particle size can be used according to the present invention. The number average particle size may be determined by visually examining a micrograph of a transmission electron microscopy ("TEM") image as described below. For example, the MgO may be micron sized, such as 0.5 to 50 microns or 1 to 15 microns, with size based on average particle size. Alternatively, the MgO may be nano sized, such as 10 to 499 nanometers, or 10 to 100 nanometers, with size based on number average particle size. It will be appreciated that these particle sizes refer to the particle size of the MgO at the time of incorporation into the curable film-forming composition. Various coating preparation methods may result in the MgO particles agglomerating, which could increase average particle size, or shearing or other action that can reduce average particle size. MgO is commercially available from a number of sources.

Ultrafine MgO particles may be used in the corrosion inhibiting component (2). As used herein, the term "ultrafine" refers to particles that have a B.E.T. specific surface area of at least 10 square meters per gram, such as 30 to 500 square meters per gram, or, in some cases, 80 to 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The curable film-forming compositions of the present invention may comprise MgO particles having a calculated equivalent spherical diameter of no more than 200 nanometers, such as no more than 100 nanometers, or, for example, 5 to 50 nanometers. As will be understood by those skilled in the art, a calculated equivalent spherical diameter can be determined from the B.E.T. specific surface area according to the following equation: Diameter (nanometers)=6000/[BET (m.sup.2/g)*.rho.(grams/cm.sup.3)].

Often the MgO particles have a number average primary particle size of no more than 100 nanometers, such as no more than 50 nanometers, or no more than 25 nanometers, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The shape (or morphology) of the MgO particles can vary. For example, generally spherical morphologies can be used, as well as particles that are cubic, platy, polyhedric, or acicular (elongated or fibrous). The particles may be covered completely in a polymeric gel, not covered at all in a polymeric gel, or covered partially with a polymeric gel. Covered partially with a polymeric gel means that at least some portion of the particle has a polymeric gel deposited thereon, which, for example, may be covalently bonded to the particle or merely associated with the particle.

The amount of MgO used in the curable film-forming composition can vary depending on the needs of the user. For example, the curable film-forming composition can comprise 1 to 50 percent by weight MgO particles, with minimums, for example, of 1 percent by weight, or 5 percent by weight, or 10 percent by weight, and maximums of 50 percent by weight, or 40 percent by weight. Exemplary ranges include 5 to 50 percent by weight, 5 to 40 percent by weight, 10 to 50 percent by weight and 10 to 40 percent by weight, with percent by weight based on the total weight of all solids, including pigments, in the curable film-forming composition.

When MgO is present in the curable film-forming composition, the corrosion inhibiting component (2) may further comprise an amino acid. Amino acids will be understood by those skilled in the art as compounds having both acid and amine functionality, with side chains specific to each amino acid. The amino acid may be monomeric or oligomeric, including a dimer. When an oligomeric amino acid is used, the molecular weight, as determined by GPC, of the oligomer is often less than 1000.

Particularly suitable amino acids are histidine, arginine, lysine, cysteine, cystine, tryptophan, methionine, phenylalanine and tyrosine. Mixtures may also be used. The amino acids can be either L- or D-enantiomers, which are mirror images of each other, or mixtures thereof. The L-configurations are typically found in proteins and nature and as such are widely commercially available. The term "amino acids" as used herein therefore refers to both the D- and L-configurations; it is foreseen that only the L- or only the D-configuration may be included. Amino acids can be purchased, for example, from Sigma Aldrich, Thermo Fisher Scientific, Hawkins Pharmaceutical, or Ajinomato. Often the amino acids glycine, arginine, proline, cysteine and/or methionine are specifically excluded.

The amino acid can be present in any amount that improves the corrosion resistance of the coating. For example, the amino acid may be present in an amount of 0.1 to 20 percent by weight, such as at least 0.1 percent by weight or at least 2 percent by weight and at most 20 percent by weight or at most 4 percent by weight; exemplary ranges include 0.1 to 4 percent by weight, 2 to 4 percent by weight, or 2 to 20 percent by weight, based on the total weight of resin solids in the curable film-forming composition.

An azole may also be present in the corrosion inhibiting component (2) in addition to or alternatively to the MgO. Azoles are 5-membered N-heterocyclic compounds that contain in the heterocyclic ring two double bonds, one to three carbon atoms and optionally a sulfur or oxygen atom. A commonly used azole is benzotriazole. Examples of other azoles are 5-methyl benzotriazole, tolyltriazole, 2,5-dimercapto-1,3,4-thiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7h-imidazo(4,5-d)pyrimidine, and 2-amino thiazole. Salts of any of the foregoing, such as sodium and/or zinc salts, are also suitable. Additional azoles include 2-hydroxybenzothiazole, benzothiazole, 1-phenyl-4-methylimidazole, and 1-(p-tolyl)-4-methylimidazole. A suitable azole-containing product is commercially available from WPC Technologies, as HYBRICOR 204. Mixtures of azoles may also be used. Typically, the azole is present in the curable film-forming composition in amounts as low as 0.1 percent, such as 0.1 to 25 percent by weight, based on total weight of resin solids in the curable film-forming composition.

The lithium silicate is present in the curable film-forming composition in an amount of 0.1 to 4.5 percent lithium by weight, such as 0.1 to 4, 0.1 to 3.5, 0.25 to 4.5, 0.25 to 4, 0.25 to 3.5, 0.5 to 4.5, 0.5 to 4, or 0.5 to 3.5, based on the total weight of resin solids in the curable film-forming composition.

In particular examples, the following combinations are contemplated: A lithium silicate (orthosilicate and/or metasilicate) may be used in combination with a thiazole. A lithium silicate (orthosilicate and/or metasilicate) may be used in combination with a diazole. A lithium silicate (orthosilicate and/or metasilicate) may be used in combination with an imidazole. A lithium silicate (orthosilicate and/or metasilicate) may be used in combination with an oxazole. A lithium silicate (orthosilicate and/or metasilicate) may be used in combination with a tetrazole. A lithium silicate (orthosilicate and/or metasilicate) may be used in combination with a triazole. In each of the above examples, magnesium oxide may further be included. Alternatively, a lithium silicate (orthosilicate and/or metasilicate) may be used in combination with magnesium oxide.

Often the curable film-forming composition is essentially free of lithium-aluminum alloy particles, clay, lithium salts, and lithium oxide ($Li_2O$). By definition, both the anion and the cation of a lithium salt should be soluble in water. Lithium polysilicates, such as the lithium metasilicate and lithium orthosilicate used in the present invention, and lithium-exchanged (silica) particles are therefore not considered to be lithium salts.

Note that $Li_2O$ is highly sensitive to water, reacting violently to produce lithium hydroxide, making it hazardous for use in the curable film-forming compositions of the present invention. By "essentially free" is meant that these materials are not essential to the composition and hence the curable film-forming composition is free of these materials in any appreciable or essential amount. If they are present, it is in incidental amounts only, typically less than 0.1 percent by weight, based on the total weight of solids in the curable film-forming composition.

The curable film-forming compositions of the present invention, comprising (1) a curable, organic film-forming binder component (i.e., (a) a resin component and (b) a curing agent component) and (2) a corrosion inhibiting component, may be provided and stored as one-package compositions prior to use. A one-package composition will be understood as referring to a composition wherein all the coating components are maintained in the same container after manufacture, during storage, etc. A typical one-package coating can be applied to a substrate and cured by any conventional means, such as by heating, forced air, radiation cure and the like. For some coatings, such as ambient cure coatings, it is not practical to store them as a one-package, but rather they must be stored as multi-package coatings to prevent the components from curing prior to use. The term "multi-package coatings" means coatings in which various components are maintained separately until just prior to application. The present coatings can also be multi-package coatings, such as a two-package coating.

Thus, the components (a) and (b) may be provided as a one-package (1K) or multi-package, such as a two-package (2K) system. The components of the organic film-forming binder (1) are often provided in separate packages and mixed together immediately prior to the reaction. When the reaction mixture is a multi-package system, the corrosion inhibiting component (2) may be present in either one or both of the separate components (a) and (b) and/or as an additional separate component package.

The curable film-forming composition of the present invention may additionally include optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the composition in an amount of 0.1 to 2 percent by weight, based on the total weight of resin solids in the film-forming composition. Other optional additives may be included such as colorants, plasticizers, abrasion-resistant particles, film strengthening particles, flow control agents, thixotropic agents, rheology modifiers, fillers, catalysts, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof. The term "colorant", as used herein is as defined in U.S. Patent Publication No. 2012/0149820, paragraphs 29 to 38, the cited portion of which is incorporated herein by reference.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles.

As used herein, the terms "adhesion promoter" and "adhesion promoting component" refer to any material that, when included in the composition, enhances the adhesion of the coating composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming composition of the present invention may also comprise alkoxysilane adhesion promoting agents, for example, acryloxyalkoxysilanes, such as γ-acryloxypropyltrimethoxysilane and methacrylatoalkoxysilane, such as γ-methacryloxypropyltrimethoxysilane, as well as epoxy-functional silanes, such as γ-glycidoxypropyltrimethoxysilane. Exemplary suitable alkoxysilanes are described in U.S. Pat. No. 6,774,168 at column 2, lines 23 to 65, the cited portion of which is incorporated by reference herein.

The adhesion promoting component is usually present in the coating composition in an amount ranging from 0.05 to 20 percent by weight, such as at least 0.05 percent by weight or at least 0.25 percent by weight, and at most 20 percent by weight or at most 15 percent by weight, with ranges such as 0.05 to 15 percent by weight, 0.25 to 15 percent by weight, or 0.25 to 20 percent by weight, with the percentages by weight being based on the total weight of resin solids in the composition.

The coating compositions of the present invention may also comprise, in addition to any of the previously described corrosion resisting particles, conventional non-chrome corrosion resisting particles. Suitable conventional non-chrome corrosion resisting particles include, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX AC3 and/or SHIELDEX. C303. Suitable amorphous silica is available from W. R. Grace & Co. as SYLOID. Suitable zinc hydroxyl phosphate is commercially available from Elementis Specialties, Inc. as NALZIN. 2. These conventional non-chrome corrosion resisting pigments typically comprise particles having a particle size of approximately one micron or larger. These particles may be present in the coating compositions of the present invention in an amount ranging from 5 to 40 percent by weight, such as at least 5 percent by weight or at least 10 percent by weight, and at most 40 percent by weight or at most 25 percent by weight, with ranges such as 10 to 25 percent by weight, with the percentages by weight being based on the total solids weight of the composition.

The present coatings may also comprise one or more organic inhibitors. Examples of such inhibitors include but are not limited to sulfur and/or nitrogen containing heterocyclic compounds, examples of which include thiophene, hydrazine and derivatives, pyrrole and derivatives. When used, organic inhibitors may be present in the coating compositions in an amount ranging from 0.1 to 20 percent by weight, such as 0.5 to 10 percent by weight, with weight percentages being based on the total solids weight of the composition.

The present invention further provides a metal substrate at least partially coated with the curable film-forming composition described above.

The metal substrates used in the present invention include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy,) and/or zinc-iron alloys. Also, aluminum, aluminum alloys, zinc-aluminum alloys such as GALFAN, GALVALUME, aluminum plated steel and aluminum alloy plated steel substrates may be used. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on one or more surfaces, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates. The substrate may comprise part of a vehicle. "Vehicle" is used herein in its broadest sense and includes all types of vehicles, manned and unmanned, such as but not limited to airplanes, helicopters, drones, cars, trucks, buses, vans, golf carts, motorcycles, bicycles, railroad cars, tanks and the like. It will be appreciated that the portion of the vehicle that is coated according to the present invention may vary depending on why the coating is being used. Often the substrate is an aircraft part.

The curable film-forming composition may be applied directly to the metal substrate when there is no intermediate coating between the substrate and the curable film-forming composition. By this is meant that the substrate may be bare, as described below, or may be treated with one or more pretreatment compositions as described below, but the substrate is typically not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, MI), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

The metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics*, 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques. The use of a spray-applied or electrodeposited primer or primer-surfacer under the curable film-forming composition of the present invention is usually unnecessary because of the superior corrosion resistance afforded by the composition of the present invention.

The coating compositions of the present invention may be used alone as a protective layer or may serve as a unicoat, or monocoat, layer. Alternatively, the compositions of the present invention may be in combination as primers, basecoats, and/or topcoats. Thus the present invention provides for a multilayer coated metal substrate. Such a multilayer coated substrate comprises:
 (a) a metal substrate;
 (b) a curable film-forming composition applied to said metal substrate, wherein the curable film-forming composition comprises:
  (1) a curable, organic film-forming binder component; and
  (2) a corrosion inhibiting component comprising a lithium silicate, present in the curable film-forming composition in an amount of 0.1 to 4.5 percent lithium by weight, based on the total weight of resin solids in the curable film-forming composition; and
 (c) an additional coating layer applied on top of at least a portion of the curable film-forming composition. In particular examples, the curable film-forming composition described above is a primer coating applied to the substrate and an additional coating layer, applied on top of the curable film-forming composition, is a topcoat composition. In another example, the curable film-forming composition is a primer coating and the additional coating layer is a primer surfacer coating. In certain examples, the additional coating layer comprises a fluoropolymer and/or a polyurethane polymer as described above.

The curable film-forming compositions of the present invention are often used as corrosion resistant primers. As indicated, the present invention may be directed to metal substrate primer coating compositions, such as "etch primers." As used herein, the term "primer coating composition" refers to coating compositions from which an undercoating may be deposited onto a substrate. In some industries or on certain substrates, the primer is applied to prepare the surface for application of a protective or decorative coating system. In other industries or substrates, another coating layer is not applied on top of the primer. For example, substrate surfaces that have limited or no external exposure might have a primer with no other layer on top. As used herein, the term "etch primer" refers to primer coating compositions that include an adhesion promoting component, such as a free acid as described in more detail above.

Suitable top coats (base coats, clear coats, pigmented monocoats, and color-plus-clear composite compositions) include any of those known in the art, and each may be waterborne, solventborne or powdered. The top coat typically includes a film-forming resin, crosslinking material and pigment (in a colored base coat or monocoat). Non-limiting examples of suitable base coat compositions include waterborne base coats such as are disclosed in U.S. Pat. Nos. 4,403,003; 4,147,679; and 5,071,904. Suitable clear coat compositions include those disclosed in U.S. Pat. Nos. 4,650,718; 5,814,410; 5,891,981; and WO 98/14379.

The additional coating layer applied on top of the curable film-forming composition may comprise a corrosion inhibiting component comprising a lithium silicate, magnesium oxide, and/or an azole; i.e., the additional coating layer applied on top of the curable film-forming composition may comprise a corrosion inhibiting component comprising at least one of a lithium silicate, magnesium oxide, and an azole. In these scenarios, the additional coating layer may be the same as or different from the curable film-forming composition. It may be different from the curable film-forming composition, while still falling under the scope of the curable film-forming composition of the present invention; for example, the curable film-forming binder component of the additional coating layer may be different from that of the first, but it may still be a composition according to the present invention.

The present invention further provides a multilayer coated metal substrate comprising:
 (a) a metal substrate;
 (b) a first curable film-forming composition applied to said metal substrate, wherein the first curable film-forming composition comprises:
  (1) a curable, organic film-forming binder component; and
  (2) a corrosion inhibiting component; and
 (c) a second curable film-forming composition applied on top of at least a portion of the first curable film-forming composition; wherein the second curable film-forming composition comprises:
  (1) a curable, organic film-forming binder component that is the same as or different from the curable, organic film-forming binder component in the first curable film-forming composition; and
  (2) a corrosion inhibiting component that is the same as or different from the corrosion inhibiting component in the first curable film-forming composition; and wherein the corrosion inhibiting component (2) in each of the first and second curable film-forming compositions independently comprises (i) a lithium compound comprising lithium silicate and/or a lithium salt; (ii) magnesium oxide and/or (iii) an azole. Suitable lithium salts include lithium carbonate, lithium oxalate, lithium phosphate, lithium sulfate, lithium tetraborate, lithium acetate, lithium zirconate, and lithium molybdate. Combinations of lithium compounds are also suitable.

In particular examples, the following combinations are contemplated: a lithium compound may be in one layer (first or second layer) and a thiazole in the other layer. A lithium compound may be in one layer (first or second layer) and a diazole in the other layer. A lithium compound may be in one layer (first or second layer) and an imidazole in the other layer. A lithium compound may be in one layer (first or second layer) and an oxazole in the other layer. A lithium compound may be in one layer (first or second layer) and a tetrazole in the other layer. A lithium compound may be in one layer (first or second layer) and a triazole in the other layer. In each of the above examples, magnesium oxide may be used in combination with the lithium compound and/or the azole.

In additional particular examples, magnesium oxide may be in one layer (first or second layer) and a thiazole in the other layer. Magnesium oxide may be in one layer (first or second layer) and a diazole in the other layer. Magnesium oxide may be in one layer (first or second layer) and an imidazole in the other layer. Magnesium oxide may be in one layer (first or second layer) and an oxazole in the other layer. Magnesium oxide may be in one layer (first or second layer) and a tetrazole in the other layer. Magnesium oxide may be in one layer (first or second layer) and a triazole in the other layer.

In certain scenarios, it may be desirable that each of the lithium compound, magnesium oxide, and azole are all present in the multilayer coated metal substrate; i.e., all three corrosion inhibitors are present in the coating stack. They may be present in each film-forming composition in any combination, provided at least one is present in each coating layer. For example, a lithium compound and magnesium oxide may be in one layer (first or second layer) and a thiazole in the other layer. A lithium compound and magnesium oxide may be in one layer (first or second layer) and a diazole in the other layer. A lithium compound and magnesium oxide may be in one layer (first or second layer) and an imidazole in the other layer. A lithium compound and magnesium oxide may be in one layer (first or second layer) and an oxazole in the other layer. A lithium compound and magnesium oxide may be in one layer (first or second layer) and a tetrazole in the other layer. A lithium compound and magnesium oxide may be in one layer (first or second layer) and a triazole in the other layer. A lithium compound may be in one layer (first or second layer) and a thiazole and magnesium oxide in the other layer. A lithium compound may be in one layer (first or second layer) and a diazole and magnesium oxide in the other layer. A lithium compound may be in one layer (first or second layer) and an imidazole and magnesium oxide in the other layer. A lithium compound may be in one layer (first or second layer) and an oxazole and magnesium oxide in the other layer. A lithium compound may be in one layer (first or second layer) and a tetrazole and magnesium oxide in the other layer. A lithium compound may be in one layer (first or second layer) and a triazole and magnesium oxide in the other layer.

In this multilayer coated metal substrate of the present invention, the metal substrate may be any of those disclosed above. Likewise, each of the first and second curable film-forming compositions may independently comprise any of the curable, organic film-forming binders disclosed above. Moreover, for example, in this multilayer coated metal substrate, the curable film-forming composition may be a primer coating applied to the substrate and the second coating layer, applied on top of the first curable film-forming composition, may be a topcoat composition. In another example, the first curable film-forming composition may be a primer coating and the second coating layer may be a second primer, such as a primer surfacer.

The coating compositions of the present invention may be applied to a substrate by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, can be used.

After application of the composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time. The thickness of the coating is usually from 0.1 to 3 mils (2.5 to 75 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step. Additionally, the first coating composition may be applied and then a second applied thereto "wet-on-wet". Alternatively, the first coating composition can be cured before application of one or more additional coating layers.

Coated metal substrates of the present invention may demonstrate excellent corrosion resistance as determined by salt spray corrosion resistance testing.

Each of the characteristics and examples described above, and combinations thereof, may be said to be encompassed by the present invention. The present invention is thus drawn to the following nonlimiting aspects: in a first aspect, a curable film-forming composition is provided by the present invention, comprising: (1) a curable, organic film-forming binder component; and (2) a corrosion inhibiting component comprising a lithium silicate, present in the curable film-forming composition in an amount of 0.1 to 4.5 percent lithium by weight, based on the total weight of resin solids in the curable film-forming composition.

In a second aspect, in the composition according to the first aspect described above, the organic film-forming binder component (1) comprises (a) a resin component comprising epoxide functional groups; and (b) a curing agent component comprising amine functional groups.

In a third aspect, in any of the compositions according to either of the first or second aspect described above, the lithium silicate comprises lithium orthosilicate and/or lithium metasilicate.

In a fourth aspect, in any of the compositions according to any aspect described above, the corrosion inhibiting component (2) further comprises magnesium oxide and/or an azole.

In a fifth aspect, a metal substrate is provided, at least partially coated with any of the curable film-forming compositions according to any of the first through fourth aspects above.

In a sixth aspect, a coated metal substrate is provided according to the fifth aspect described above wherein the curable film-forming composition is applied directly to the metal substrate and there is no intermediate coating between the substrate and the curable film-forming composition.

In a seventh aspect, a coated metal substrate is provided according to either of the fifth or sixth aspects above, wherein the metal substrate comprises aluminum.

In an eighth aspect, a coated metal substrate is provided according to any of the fifth through seventh aspects above, wherein the metal substrate is an aircraft part.

In a ninth aspect, a coated metal substrate is provided according to any of the fifth through eighth aspects above, further comprising an additional coating layer applied on top of at least a portion of the curable film-forming composition. In certain aspects, the additional coating layer may comprise a fluoropolymer and/or a polyurethane polymer.

In a tenth aspect, a coated metal substrate is provided according to the ninth aspect above, wherein the curable film-forming composition is a primer coating and the additional coating layer is a topcoat composition.

In an eleventh aspect, a coated metal substrate is provided according to the ninth aspect above, wherein the curable film-forming composition is a colored basecoat layer and the additional coating layer is a transparent clearcoat composition.

In a twelfth aspect, a coated metal substrate is provided according to any of the ninth through eleventh aspects above, wherein the additional coating layer comprises a corrosion inhibiting component comprising a lithium silicate, magnesium oxide and/or an azole.

In a thirteenth aspect of the present invention, a multilayer coated metal substrate is provided comprising: (a) a metal substrate; (b) a first curable film-forming composition applied to said metal substrate, wherein the first curable film-forming composition comprises: (1) a curable, organic film-forming binder component; and (2) a corrosion inhibiting component; and (c) a second curable film-forming composition applied on top of at least a portion of the first curable film-forming composition; wherein the second curable film-forming composition comprises: (1) a curable, organic film-forming binder component that is the same as or different from the curable, organic film-forming binder component in the first curable film-forming composition; and (2) a corrosion inhibiting component that is the same as or different from the corrosion inhibiting component in the first curable film-forming composition; and wherein the corrosion inhibiting component (2) in each of the first and second curable film-forming compositions independently comprises (i) a lithium compound comprising lithium silicate and/or a lithium salt; (ii) magnesium oxide and/or (iii) an azole.

In a fourteenth aspect, a multilayer coated metal substrate is provided according to the thirteenth aspect above, wherein each of the lithium silicate, magnesium oxide, and azole are present.

In an fifteenth aspect, a multilayer coated metal substrate is provided according to the thirteenth aspect above, wherein the corrosion inhibiting component (2) in the first curable film-forming composition (b) comprises magnesium oxide and the corrosion inhibiting component (2) in the second curable film-forming composition (c) comprises a lithium compound (i) and/or an azole (iii).

In a sixteenth aspect, a multilayer coated metal substrate is provided according to any of the thirteenth to fifteenth aspects above, further comprising (d) an additional film-forming composition applied on top of at least a portion of the second curable film-forming composition.

The invention will be further described by reference to the following examples. Unless otherwise indicated, all parts are by weight.

EXAMPLES

TABLE 1 provides a description of materials used in preparation of the examples.

| Component | Description | Supplier |
| --- | --- | --- |
| Ancamide ® 2569 | Polyamide curing agent | Air Products |
| Ancamide ® 2445 | Polyamide curing agent | Air Products |
| Ancamine ® 2432 | Polyamine curing agent | Air Products |
| Ancamine ® 1895 | Polyamine curing agent | Air Products |
| Gaskamine ® 328 | Polyamine curing agent | Mitsubishi Gas Chemical |
| Ancamine ® K54 | Catalyst | Air Products |
| Ti-Pure ® R-706-11 | Titanium Dioxide | DuPont |
| Bayferrox ® 3920 | Iron oxide; C.I. pigment yellow 42 | Lanxess Corp. |
| Gasil ® IJ35 | Fine Particle Silica | Ineos Silicas America |
| Blanc Fix (Micro) | Barium Sulfate | Sachtleben Chemie GmbH |
| ACEMATT ® OK412 | Wax treated silicon dioxide | Evonik Degussa |
| Oxsol ® 100 | 4-chloro trifluoromethylbenzene | Rhodia |
| Epon ® 828 | Bisphenol A/epichlorohydrin resin | Momentive |
| Erisys ® GA-240 | Polyfunctional epoxy resin | CVS Specialty Chemicals |
| DEN ® 431 | Epoxy Novolac Resin | Dow Chemical |
| Eponex ® 1510 | Hydrogenated Bisphenol A/epichlorohydrin resin | Momentive-Hexion |
| Epon ® TM811 | Modified Epoxy resin | Momentive |
| Silquest ® A187 | Epoxy-silane | Momentive |
| Silquest ® A189 | 3-mercaptopropyl trimethoxysilane (3-MPTMS) | Momentive |
| DBTDL Solution | 10% Solution of DABCO T12 in xylene | Air Products (as DABCO T12) |
| Nano Magnesium Oxide | MgO: 20 nm ave. particle size, 50 $m^2$/g surface area | Nano Structured and Amorphous Materials |

TABLE 1-continued provides a description of materials used in preparation of the examples.

| Component | Description | Supplier |
|---|---|---|
| Maglite ® Y | MgO: 10 micron ave. particle size, 55 m²/g surface area | Hallstar |
| Magchem ® 10-325 | MgO: 10 micron ave. particle size, 3 m²/g surface area | Martin Marietta Magnesia Specialties |
| Lithium Orthosilicate | Lithium Orthosilicate | Rockwood Lithium |
| Lithium Metasilicate | Lithium Metasilicate | Rockwood Lithium |
| Lithium Carbonate | Lithium Carbonate | Rockwood Lithium |
| Hybricor ® 204 | Organic (azole)/Inorganic Hybrid Corrosion Inhibitor | WPC Technologies, Inc. |
| Mercaptobenzothiazole | 2-mercaptobenzothiazole (MBT) | Americas International, Inc. |
| Dimercaptothiadiazole | 2,5-Dimercapto-1,3,4-thiadiazole (DMTD) | Alfa Aesar |
| Benzotriazole | Cobratec 99/BZ (BZT) | PMC Specialties Group |
| Sodium Mercaptobenzothiazole | Sodium salt of 2-mercaptobenzothiazole (NaMBT) | TCI America |
| BYK 358N | Acrylate Copolymer | BYK Chemie |
| CA1800CX | Solvent Mixture/Thinner | PPG Aerospace/ PRC Desoto |
| EAC-8 | Metal Conditioner | PPG Aerospace/ Eldorado |
| Milling media | Part #74582 minimum 85% Al₂O₃ (16 to 20 mesh) | Coors Tek |
| Turco 4215 NC-LT | Alkaline Cleaner | Henkel |
| Nitric Acid, (68 to 70%) | Acidic Pickling Component | Fisher Scientific |
| Sulfuric Acid (93 to 98%) | Acidic Pickling Component | Fisher Scientific |
| Iron (III) Sulphate Pentahydrate | Acidic Pickling Component | Fisher Scientific |
| Sodium Hydroxide Beads | Alkaline Etch Component | Fisher Scientific |
| Triethylamine | Alkaline Etch Component | Air Products |
| Bostex 378 | Alkaline Etch Component | Akron Dispersions |
| Desmodur N 3300 | Modified Polyisocyanate | Bayer |
| CA8800/B70846 | Polyurethane Topcoat Base Component (PU Topcoat) | PPG Industries |
| CA8800Z | Polyurethane Topcoat Activator Component | PPG Industries |
| CA8800CT | Polyurethane Topcoat Thinner Component | PPG Industries |
| CA9311/F36173 | Polyurethane Advanced Performance Topcoat Base Component (PU AP Topcoat) | PPG Industries |
| CA9300 | Polyurethane Advanced Performance Topcoat Activator Component | PPG Industries |

For all examples, amounts given for each material are in terms of grams by weight unless otherwise noted. Example 1 is a comparative example. (Note: all comparative examples are labelled "Comp.") Examples 2-4 demonstrate the preparation of curable film-forming compositions according to the present invention.

TABLE 2

No inhibitor vs. Lithium orthosilicate (various levels)

| Material | Comp. Ex 1 g | Ex 2 g | Ex 3 g | Ex 4 g |
|---|---|---|---|---|
| Component A | | | | |
| Ancamide 2569 | 20.8 | 20.8 | 20.8 | 20.8 |
| Ancamine 2432 | 13.8 | 13.8 | 13.8 | 13.8 |
| Ancamine K-54 | 1.3 | 1.3 | 1.3 | 1.3 |
| N-butyl alcohol | 51.7 | 51.7 | 51.7 | 51.7 |
| Xylene | 6.3 | 6.3 | 6.3 | 6.3 |
| Total Component B | 93.9 | 93.9 | 9.39 | 93.9 |
| Epon 828 | 65.8 | 65.8 | 65.8 | 65.8 |
| Xylene | 3.4 | 3.4 | 3.4 | 3.4 |
| Oxsol 100 | 66.8 | 66.8 | 66.8 | 66.8 |

TABLE 2-continued

No inhibitor vs. Lithium orthosilicate (various levels)

| Material | Comp. Ex 1 g | Ex 2 g | Ex 3 g | Ex 4 g |
|---|---|---|---|---|
| Silquest A-187 | 1.6 | 1.6 | 1.6 | 1.6 |
| Ti-Pure R-706-11 | 100.0 | 95.0 | 90.0 | 85.0 |
| Lithium orthosilicate | 0 | 5.0 | 10.0 | 15.0 |
| CA1800CX Thinner | 23.8 | 23.8 | 23.8 | 23.8 |
| Total | 261.4 | 261.4 | 261.4 | 261.4 |
| Total Blended Weight | 355.3 | 355.3 | 355.3 | 355.3 |

Coating Examples 1-4 were prepared as follows:

For Component A of each example, all materials were weighed into suitable containers and mixed thoroughly using an air motor and mixing blade. For Component B of each example, all materials with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 3 hours. All final dispersions had Hegman gauge readings greater than 7. The Silquest A-187 was added to the Component B mixtures after the pigment dispersion process was completed. Each final Component B mixture was then thoroughly mixed. Prior to coating application, the corresponding ratios of each total Component A and total Component B shown in TABLE 2 were blended together, thoroughly mixed and given an induction time between 30 and 60 minutes prior to application.

The coatings of Examples 1-4 were spray applied onto 2024T3 bare aluminum alloy substrate panels to a dry film thickness of between 0.6 to 1.2 mils using an air atomized spray gun. Prior to coating application, the aluminum alloy substrate panels were prepared as follows. Aluminum alloy panels were cleaned using a methyl ethyl ketone wipe then processed as outlined in the table below.

| Alkaline Etch and Nitric Sulfuric Pickle Process | | | | |
|---|---|---|---|---|
| Step | Process Description | Solution | Time | Temp |
| 1 | Alkaline Clean | Turco Cleaning Solution | 5 minutes | 60-70° C. |
| 2 | Rinse | DI Water | 1 minute | ambient |
| 3 | Air Dry | N/A | 0 to 12 hrs | |
| 4 | Alkaline Etch | Alkaline Etch Solution | 3 minutes | ambient |
| 5 | Rinse | DI Water | 1 minute | ambient |
| 6 | DI Squirt Bottle Rinse | DI Water | N/A | ambient |
| 7 | De-smut | 30% Nitric Acid in DI Water | 0.25 to 1 minute | ambient |
| 8 | Rinse | DI Water | 1 | ambient |
| 9 | Acid Pickle | Nitric Sulfuric Pickle Solution | 8 | 50-60° C. |
| 10 | Rinse | DI Water | 1 | ambient |
| 11 | Rinse | DI Water | 1 | ambient |
| 12 | DI Squirt Bottle Rinse | DI Water | N/A | ambient |
| 13 | Air Dry | N/A | 1 to 3 hours | ambient |

The solutions used for the Alkaline Etch/Nitric Sulfuric Pickle process are listed below. Procedures are outlined below.

| Charge | Turco Cleaning Solution | g/ml |
|---|---|---|
| 1 | Turco 4215 NC LT | 48 g |
| 2 | DI Water | Balance to total of 1000 ml |

Turco 4215 NC-LT was weighed in a 1000 ml beaker, and DI Water added to achieve 1000 ml of solution. The mixture was stirred until thoroughly dissolved.

| Charge | Alkaline Etch Solution | g/ml |
|---|---|---|
| 1 | NaOH beads | 612 g |
| 2 | DI Water | 612 g |
| 3 | Bostex 378 | 60 ml |
| 4 | Triethylamine | 40 ml |
| 5 | DI Water | 3100 ml |

Charge #2 was weighed in a glass vessel which can accommodate 4000 ml; charge #1 was weighed in a separate container; charge #1 was slowly added to charge #2 with agitation; an exothermic reaction ensued. The solution was allowed to cool for 15 minutes; remaining charges were added in order with thorough mixing between additions.

| Charge | Nitric Sulfuric Pickle Solution | g/ml |
|---|---|---|
| 1 | DI Water | 500 ml |
| 2 | Sulfuric Acid (93-98%) | 290 g |
| 3 | Nitric Acid (68-70%) | 150 g |
| 4 | Iron (III) Sulphate•5H2O | 76.75 g |
| 5 | DI Water | balance to total 1000 ml |

Charge #1 was placed in a 1000 ml beaker; charge #2 and charge #3 were weighed in two separate containers; charge #2, followed by charge #3, were slowly added to the 1000 ml beaker with agitation; an exothermic reaction ensued. Charge #4 was weighed in a separate container and slowly added to the 1000 ml beaker with agitation. Once dissolved, DI water was added to achieve 1000 ml of solution.

The test panels coated with coating Examples 1-4 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 3 were at 840 hours of exposure for examples 1-4. The panels were rated according to the following scale:

Scribe Corrosion: Lower Rating Number is Better

Rating is 0 to 100 and number represents percent of scribe area showing visible corrosion.

Shiny/Nature of Scribe: Lower Rating Number is Better

Rating is 0-100 and number represents percent of scribe which is dark/tarnished scribe.

Blisters: Lower Rating Number is Better

Total number of blisters adjacent to scribe and away from scribe (i.e. Face) blisters are counted up to 30

Max. Scribe Blister Size: Lower Number Rating is Better

The size of the largest blister adjacent to the scribe is recorded as:

0 No scribe blisters are present

<1.25 mm Largest scribe blister is less than 1.25 mm diameter

>1.25 mm Largest scribe blister is between 1.25 mm and 2.5 mm diameter

>2.5 mm Largest scribe blister is greater than 2.5 mm diameter

TABLE 3

Corrosion Test Results for Examples 1-4

| Example # | Description | Scribe Corr. | Scribe Shine | Scribe Blisters | Face Blisters | Max. Scribe Blister Size |
|---|---|---|---|---|---|---|
| Comp. 1 | No inhibitor | 25 | 95 | >30 | 0 | >1.25 mm |
| 2 | 1.2% Li via Lithium orthosilicate | 15 | 80 | 0 | 0 | 0 |
| 3 | 2.3% Li via Lithium orthosilicate | 10 | 75 | 0 | 0 | 0 |
| 4 | 3.5% Li via Lithium orthosilicate | 10 | 85 | 0 | 0 | 0 |

The corrosion data in TABLE 3 clearly shows that Coating Examples 2, 3, and 4 which contained the lithium orthosilicate corrosion inhibitor at levels of 1.2%, 2.3% and 3.5% lithium respectively provided measurably enhanced corrosion protection for the metal substrate as compared to Comparative Coating Example 1 which contained no corrosion inhibitor. Evidence of the enhanced corrosion protection is observed in the presence of lower amounts of corrosion in the scribe, the more shiny nature of the scribes and a reduction in blistering of the coating along the edge of the scribes.

TABLE 4

No inhibitor vs. Lithium orthosilicate (high level)

| Material | Comp. Ex 5 g | Comp. Ex 6 g |
|---|---|---|
| Component A | | |
| Gaskamine 328 | 27.5 | 27.5 |
| Ancamine K-54 | 1.3 | 1.3 |
| N-butyl alcohol | 51.7 | 51.7 |
| Xylene | 6.3 | 6.3 |
| Ti-Pure R-706-11 | 18.9 | 18.9 |
| Nano-magnesium oxide | 35.0 | 0 |
| Lithium orthosilicate | 0 | 35.0 |
| Total | 140.7 | 140.7 |
| Component B | | |
| Erisys GA-240 | 49.2 | 49.2 |
| DEN 431 | 21.6 | 21.6 |
| Xylene | 3.4 | 3.4 |
| Silquest A-187 | 1.6 | 1.6 |
| Oxsol 100 | 35.3 | 35.3 |
| CA1800CX Thinner | 23.8 | 23.8 |
| Total | 134.9 | 134.9 |
| Total Blended Weight | 275.6 | 275.6 |

Comparative Coating Examples 5 & 6 were prepared as follows:

For Component A of each example, all materials were weighed and placed into glass jars. Dispersing media was then added to each jar at a level equal to approximately one-half the total weight of the component materials. The jars were sealed with lids and then placed on a Lau Dispersing Unit with a dispersion time of 3 hours. All final dispersions had Hegman gauge readings greater than 6. For Component B of each example, all materials with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 3 hours. All final dispersions had Hegman gauge readings greater than 7. The Silquest A-187 was added to the Component B mixtures after the pigment dispersion process was completed. Each final Component B mixture was then thoroughly mixed. Prior to coating application, the corresponding ratios of each total Component A and total Component B shown in TABLE 4 were blended together, thoroughly mixed and given an induction time between 30 and 60 minutes prior to application.

The coatings of Examples 5 & 6 were spray applied onto 2024T3 bare aluminum alloy substrate panels to a dry film thickness of between 0.6 to 1.5 mils using an air atomized spray gun. Prior to coating application, the aluminum alloy substrate panels were prepared as follows. 2024T3 aluminum alloy panels were cleaned using a methyl ethyl ketone wipe followed by wet abrading using Scotchbrite® 7448 ultrafine pad using EAC-8 Conditioner to produce a water-break free surface. After abrasion EAC-8 was spritzed on the surface of the panel and allowed to dwell for 1 minute. Panels were rinsed thoroughly with water, wiped with gauze to ensure removal of oxide and allowed to dry for 1 to 3 hours prior to coating application.

The test panels coated with coating Examples 5 & 6 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 5 were at 1920 hours of exposure for examples 5 & 6. The panels were rated according to the following scale:

Scribe Corrosion: Lower Rating Number is Better
   Rating is 0 to 100 and number represents percent of scribe area showing visible corrosion.
Shiny/Nature of Scribe: Lower Rating Number is Better
   Rating is 0-100 and number represents percent of scribe which is dark/tarnished scribe.
Blisters: Lower Rating Number is Better
   Total number of blisters adjacent to scribe and away from scribe (i.e. Face)
   blisters are counted up to 30
Max. Scribe Blister Size: Lower Number Rating is Better
   The size of the largest blister adjacent to the scribe is recorded as:
   0 No scribe blisters are present
   <1/16" Largest scribe blister is less than 1/16" diameter
   >1/16" Largest scribe blister is between 1/16" and 1/8" diameter
   >1/8" Largest scribe blister is greater than 1/8" diameter

TABLE 5

Corrosion Test Results for Examples 5 & 6

| Example # | Description | Scribe Corr. | Scribe Shine | Scribe Blisters | Face Blisters | Max. Scribe Blister Size |
|---|---|---|---|---|---|---|
| Comp. 5 | 35% Comparative corrosion inhibitor | 10 | 85 | 4 | 3 | <1/16" |
| Comp. 6 | 8.1% Li via Lithium orthosilicate | 0 | 10 | na* | na* | na* | na*: face of coated panel is blistered and coating is delaminating from substrate The corrosion data in TABLE 5 clearly shows that when compared to a known chrome-free inorganic corrosion inhibitor at higher loadings (8.1% lithium) the lithium polysilicate provided outstanding improvements in corrosion protection, however the coating film became water sensitive which resulted in severe blistering and delamination of the coating from the metal substrate. Therefore, the lithium polysilicates must be kept below levels that may cause detrimental water sensitivity to the coating film.

TABLE 6

MgO-only (Comparative) vs. MgO/Li-orthosilicate & MgO/Li-metasilicate (Combinations in accordance with the invention)

| Material | Comp. Ex 7 g | Ex 8 g | Ex 9 g |
|---|---|---|---|
| Component A | | | |
| Ancamide 2569 | 20.8 | 20.8 | 20.8 |
| Ancamine 2432 | 13.8 | 13.8 | 13.8 |

TABLE 6-continued

MgO-only (Comparative) vs. MgO/Li-orthosilicate & MgO/Li-metasilicate (Combinations in accordance with the invention)

| Material | Comp. Ex 7 g | Ex 8 g | Ex 9 g |
|---|---|---|---|
| Ancamine K-54 | 1.3 | 1.3 | 1.3 |
| N-butyl alcohol | 29.3 | 29.3 | 29.3 |
| Xylene | 6.3 | 6.3 | 6.3 |
| Total | 71.5 | 71.5 | 71.5 |
| Component B | | | |
| Epon 828 | 65.8 | 65.8 | 65.8 |
| Xylene | 3.4 | 3.4 | 3.4 |
| Oxsol 100 | 38.3 | 38.3 | 38.3 |
| Silquest A-187 | 1.6 | 1.6 | 1.6 |
| Ti-Pure R-706-11 | 65.0 | 60.0 | 65.0 |
| Nano-magnesium oxide | 10.0 | 10.0 | 10.0 |
| Lithium orthosilicate | 0 | 5.0 | 0 |
| Lithium metasilicate | 0 | 0 | 5.0 |
| n-butyl acetate | 6.0 | 0 | 10.5 |
| CA1800CX Thinner | 23.8 | 23.8 | 23.8 |
| Total | 213.9 | 207.9 | 223.4 |
| Total Blended Weight | 285.4 | 279.4 | 294.9 |

Coating Examples 7-9 were prepared as follows:

For Component A of each example, all materials were weighed into suitable containers and mixed thoroughly using an air motor and mixing blade. For Component B of each example, all materials with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 1.5 hours. All final dispersions had Hegman gauge readings greater than 7. The Silquest A-187 was added to the Component B mixtures after the pigment dispersion process was completed. Each final Component B mixture was then thoroughly mixed. Prior to coating application, the corresponding ratios of each total Component A and total Component B shown in TABLE 6 were blended together, thoroughly mixed and given an induction time between 30 and 60 minutes prior to application.

The coatings of Examples 7-9 were spray applied onto 2024T3 bare aluminum alloy substrate panels to a dry film thickness of between 0.6 to 1.2 mils using an air atomized spray gun. Prior to coating application, the aluminum alloy substrate panels were prepared in the same manner as described for examples 1-4.

The test panels coated with coating Examples 7-9 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 7 were at 1128 hours of exposure for examples 7-9. The panels were rated according to the same scale used for Examples 1-4.

TABLE 7

Corrosion Test Results for Examples 7-9

| Example # | Description | Scribe Corr. | Scribe Shine | Scribe Blisters | Face Blisters | Max. Scribe Blister Size |
|---|---|---|---|---|---|---|
| Comp. 7 | 10% MgO | 25 | 90 | 19 | 0 | <1.25 mm |
| 8 | 10% MgO + 1.2% Li via lithium orthosilicate | 5 | 80 | 0 | 0 | 0 |
| 9 | 10% MgO + 0.8% Li via lithium metasilicate | 10 | 75 | 4 | 0 | <1.25 mm |

The corrosion data in TABLE 7 clearly shows that coatings which contained the lithium polysilicate corrosion inhibitors in addition to MgO provided enhanced corrosion protection for the metal substrate as compared to MgO alone. Evidence of the enhanced corrosion protection is observed in the presence of lower amounts of corrosion in the scribe, the more shiny nature of the scribes and a reduction in blistering of the coating along the edge of the scribes.

TABLE 8

Unicoat (no inhibitor vs. Lithium silicate + MgO)

| Material | Comp. Ex 10 g | Ex 11 g |
|---|---|---|
| Component A | | |
| Ancamide 2445 | 41.1 | 41.1 |
| Ancamine 1895 | 8.8 | 8.8 |
| Ancamine K-54 | 1.8 | 1.8 |
| N-butyl alcohol | 24.1 | 24.1 |
| Xylene | 5.9 | 5.9 |
| Ti-Pure R-706-11 | 74.5 | 25.4 |
| Gasil U35 Silica | 4.9 | 4.9 |
| Blanc-Fix (Micro) | 13.1 | 13.1 |
| Total | 174.2 | 125.1 |
| Component B | | |
| Eponex 1510 | 60.7 | 60.7 |
| Methyl n-amyl ketone | 30.4 | 30.4 |
| BYK 385N | 2.0 | 2.0 |
| Silquest A-187 | 5.1 | 5.1 |
| Nano-magnesium oxide | 0 | 44.2 |
| Lithium orthosilicate | 0 | 5.0 |
| Bayferrox 3920 | 2.6 | 2.6 |
| Total | 100.8 | 150.0 |
| Thinner Component | | |
| Methyl n-amyl ketone | 16.0 | 16.0 |
| 1:1:1 n-butyl alcohol:acetone:n-butyl acetate | | 6.0 |
| Total | 16.0 | 22.0 |
| Total Blended Weight | 291.0 | 297.1 |

Coating Examples 10-11 were prepared as follows:
For Component A of each example, all materials were weighed and placed into glass jars. Dispersing media was then added to each jar at a level equal to approximately half the total weight of the component materials. For Component B of each example, all materials with the exception of the Silquest A-187 were weighed and placed into glass jars. Dispersing media was then added to each jar at a level equal to approximately twice the total weight of the component materials. The jars for each component were sealed with lids and then placed on a Lau Dispersing Unit with a dispersion time of 3.0 hours. All final dispersions had Hegman gauge readings greater than 7. The Silquest A-187 was added to the Component B mixtures after the pigment dispersion process was completed. Each final Component B mixture was then thoroughly mixed. Prior to coating application, the corresponding ratios of each total Component A, each total Component B, and each thinner component shown in TABLE 8 were blended together, thoroughly mixed and given an induction time between 30 and 60 minutes prior to application.

The coatings of Examples 10-11 were spray applied onto 2024T3 aluminum alloy substrate panels to a dry film thickness of between 1.5 to 2.0 mils using an air atomized spray gun. Prior to coating application, the aluminum alloy substrate panels were prepared in the same manner as described for examples 1-4.

The test panels coated with coating Examples 10-11 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 9 were at 1104 hours of exposure. The panels were rated according to the same scale used for Examples 1-4.

TABLE 9

Corrosion Test Results for Examples 10-11

| Example # | Description | Scribe Corr. | Scribe Shine | Scribe Blisters | Face Blisters | Max. Scribe Blister Size |
|---|---|---|---|---|---|---|
| Comp. 10 | Unicoat w/ no corrosion inhibitor | 20 | 95 | >30 | 0 | >1.25 mm |
| 11 | Unicoat w/ 45% nano-MgO + 1.2% Li via lithium orthosilicate | 5 | 65 | 15 | 0 | <1.25 mm |

The corrosion data in TABLE 9 clearly shows that unicoat coatings which contained the lithium polysilicate corrosion inhibitors in addition to magnesium oxide corrosion inhibitor provided significantly enhanced corrosion protection for the metal substrate as compared to the same unicoat formulation containing no corrosion inhibitor. Evidence of the enhanced corrosion protection is observed in the presence of lower amounts of corrosion in the scribe, the more shiny nature of the scribes and a reduction in blistering of the coating along the edge of the scribes.

TABLE 10

Multilayer Coating (Li silicate-containing first coating + uninhibited second coating
Comparative EX 12&14, EX 13&15, EX 16&17

| Material<br>FIRST COATING | Comp.<br>Ex 12<br>g | Ex 13<br>g | Comp.<br>Ex 14<br>g | Ex 15<br>g | Ex 16<br>g | Ex 17<br>g |
|---|---|---|---|---|---|---|
| Component A | | | | | | |
| Ancamide 2569 | 20.8 | 20.8 | 20.8 | 20.8 | 20.8 | 20.8 |
| Ancamine 2432 | 13.8 | 13.8 | 13.8 | 13.8 | 13.8 | 13.8 |
| Ancamine K-54 | 1.3 | 1.3 | 1.3 | 1.3 | 1.3 | 1.3 |
| N-butyl alcohol | 29.3 | 29.3 | 29.3 | 29.3 | 29.3 | 29.3 |
| Xylene | 6.3 | 6.3 | 6.3 | 6.3 | 6.3 | 6.3 |
| Total | 71.5 | 71.5 | 71.5 | 71.5 | 71.5 | 71.5 |
| Component B | | | | | | |
| Epon 828 | 65.8 | 65.8 | 65.8 | 65.8 | 65.8 | 65.8 |
| Xylene | 3.4 | 3.4 | 3.4 | 3.4 | 3.4 | 3.4 |
| Oxsol 100 | 38.3 | 38.3 | 38.3 | 38.3 | 38.3 | 38.3 |
| Silquest A-187 | 1.6 | 1.6 | 1.6 | 1.6 | 1.6 | 1.6 |
| Ti-Pure R-706-11 | 75.0 | 70.0 | 75.0 | 70.0 | 60.0 | 60.0 |
| Nano-magnesium oxide | 0 | 0 | 0 | 0 | 10.0 | 10.0 |
| Lithium orthosilicate | 0 | 5.0 | 0 | 5.0 | 5.0 | 5.0 |
| CA1800CX Thinner | 23.8 | 23.8 | 23.8 | 23.8 | 23.8 | 23.8 |
| Total | 207.9 | 207.9 | 207.9 | 207.9 | 207.9 | 207.9 |
| Total Blended Weight | 279.4 | 279.4 | 279.4 | 279.4 | 279.4 | 279.4 |
| SECOND COATING | ml | ml | ml | ml | ml | ml |
| Component A | | | | | | |
| CA8800/B70846 | 100 | 100 | | | 100 | |
| CA9311/F36173 | | | 150 | 150 | | 150 |
| Total | 100 | 100 | 150 | 150 | 100 | 150 |
| Component B | | | | | | |
| CA8800Z | 50 | 50 | | | 50 | |
| CA9300 | | | 50 | 50 | | 50 |
| Total Component C | 50 | 50 | 50 | 50 | 50 | 50 |
| CA8800CT | 50 | 50 | | | 50 | |
| Acetone | | | 20 | 20 | | 20 |
| Total | 50 | 50 | 20 | 20 | 50 | 20 |
| Total Blended Volume | 200 | 200 | 220 | 220 | 200 | 220 |

Coating Examples 12-17 were prepared as follows:

First Coating:

For all Examples, all materials for Component A were weighed into a suitable container and mixed thoroughly using an air motor and mixing blade. For Component B of each example, all materials with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 3.0 hours. Following the 3.0 hours of dispersion time for Component B of Examples 13 and 15, an additional amount of media was added to each jar at a level approximately equal to the total weight of the component materials. The jars were sealed with lids and then place on a Lau Dispersing Unit for an additional hour of dispersion time. All dispersions had Hegman gauge readings greater than 7. The Silquest A-187 was added to the Component B mixtures for all Examples after the pigment dispersion process was completed. Each final Component B mixture was then thoroughly mixed. Prior to coating application, the corresponding ratios of each total Component A and total Component B shown in TABLE 6 were blended together, thoroughly mixed and given an induction time between 30 and 60 minutes prior to application. The First Coatings of Examples 12-17 were spray applied onto 2024T3 aluminum alloy substrate panels to a dry film thickness of between 0.7 to 1.3 mils using an air atomized spray gun. Prior to coating application, the aluminum alloy substrate panels were prepared in the same manner as described for examples 1-4. Following application of the First Coating for each Example, the coated panels were stored under ambient conditions for 12 to 24 hours before application of the Second Coating of each Example.

Second Coating:

For Examples 12, 13, 14, 15, 16, and 17 the corresponding amounts of Component A and Component B shown in Table 10 for each Example were added to suitably sized containers and mixed thoroughly using an air motor and mixing blade. The corresponding amount of Component C shown in Table 10 for each Example was then added to the corresponding blended A and B components for each Example. Once the Second Coatings for Examples 12 through 17 were thoroughly mixed, they were spray applied onto the panels previously coated with the First Coatings of Examples 12 through 17 in a manner where each Second Coating Example was applied over the corresponding First Coating Example (as shown in Table 10). Dry film thickness for the Second Coatings ranged from approximately 2.0 mils to 3.0 mils. Application of each Second Coating was performed between 10 minutes and 60 minutes after the initial mixing of each final Second Coating.

The fully coated test panels coated with coating Examples 12-17 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 11 were at 1176 hours of exposure. The panels were rated according to the same rating scale used for Examples 1-4.

TABLE 11

Corrosion Test Results for Examples 12-17

| Example # | Description | Scribe Corr. | Scribe Shine | Scribe Blisters | Face Blisters | Max. Scribe Blister Size |
|---|---|---|---|---|---|---|
| Comp. 12 | First Coating-no inhib. Second Coating PU Topcoat-no inhibitor | 25 | 95 | >30 | 0 | >2.5 mm |

TABLE 11-continued

Corrosion Test Results for Examples 12-17

| Example # | Description | Scribe Corr. | Scribe Shine | Scribe Blisters | Face Blisters | Max. Scribe Blister Size |
|---|---|---|---|---|---|---|
| 13 | First Coating-1.2% lithium via lithium orthosilicate Second Coating- PU Topcoat-no inhibitor | 15 | 85 | 3 | 0 | <1.25 mm |
| Comp. 14 | First Coating-no inhib. Second Coating- PU AP Topcoat-no inhibitor | 40 | 90 | >30 | 0 | >2.5 mm |
| 15 | First Coating-1.2% lithium via lithium orthosilicate Second Coating- PU AP -no inhibitor | 25 | 85 | 4 | 0 | <1.25 mm |
| 16 | First Coating-1.2% lithium via lithium orthosilicate + 10% MgO Second Coating- PU-no inhibitor | 20 | 90 | 4 | 0 | <1.25 mm |
| 17 | First Coating-1.2% lithium via lithium orthosilicate + 10% MgO Second Coating- PU AP -no inhibitor | 25 | 85 | 5 | 0 | <1.25 mm |

The corrosion data in TABLE 11 clearly shows that multilayer coating systems where the Second Coating contained no corrosion inhibitor (Examples 12-17), corrosion resistance over 2024 aluminum alloy was significantly better when the First Coating contained lithium orthosilicate by itself (13 & 15) or in combination with magnesium oxide (16 & 17) as compared to when the First Coating contained no corrosion inhibitor (12 & 14). Evidence of the enhanced corrosion protection is observed in the presence of lower amounts of corrosion in the scribe and a reduction in blistering of the coating along the edge of the scribes.

TABLE 12

Multilayer Coating (inhibited first coating + inhibited second coating)

| Material FIRST COATING | Ex 18 g | Ex 19 g | Ex 20 g | Ex 21 g | Ex 22 g | Ex 23 g |
|---|---|---|---|---|---|---|
| Component A | | | | | | |
| Ancamide 2569 | 20.8 | 20.8 | 20.8 | 20.8 | 18.4 | 20.8 |
| Ancamine 2432 | 13.8 | 13.8 | 13.8 | 13.8 | 12.2 | 13.8 |
| Ancamine K-54 | 1.3 | 1.3 | 1.3 | 1.3 | 1.3 | 1.3 |
| N-butyl alcohol | 29.3 | 29.3 | 29.3 | 29.3 | 24.2 | 29.3 |
| Xylene | 6.3 | 6.3 | 6.3 | 6.3 | 2.9 | 6.3 |
| Nano-magnesium oxide | | | | | 15.0 | 15.0 |
| Ti-Pure R-706-11 | | | | | 30.0 | |
| Total | 71.5 | 71.5 | 71.5 | 71.5 | 104.0 | 86.5 |
| Component B | | | | | | |
| Epon 828 | 65.8 | 65.8 | 65.8 | 65.8 | 60.1 | 65.8 |
| Epon TM 8111 | | | | | 9.6 | |
| n-Butyl acetate | | | | | 29.8 | |
| Xylene | 3.4 | 3.4 | 3.4 | 3.4 | 1.5 | 3.4 |
| Oxsol 100 | 38.3 | 38.3 | 38.3 | 38.3 | | 38.3 |
| Silquest A-187 | 1.6 | 1.6 | 1.6 | 1.6 | 1.6 | 1.6 |

TABLE 12-continued

Multilayer Coating (inhibited first coating + inhibited second coating)

| | | | | | | |
|---|---|---|---|---|---|---|
| Ti-Pure R-706-11 | 70.0 | 70.0 | 60.0 | 60.0 | | 40.0 |
| Nano-magnesium oxide | | | 10.0 | 10.0 | | 20.0 |
| Maglite Y | | | | | 15.0 | |
| MagChem 10-325 | | | | | 30.0 | |
| OK-412 silica | | | | | 10.0 | |
| Lithium orthosilicate | 5.0 | 5.0 | 5.0 | 5.0 | | |
| Acetone | | | 23.8 | 23.8 | 16.3 | |
| CA1800X | 23.8 | 23.8 | | | | 23.8 |
| Total Component C | 207.9 | 207.9 | 207.9 | 207.9 | 173.9 | 192.9 |
| 1:1:1 n-butyl alcohol:acetone:n-butyl acetate | | | | | 31.3 | |
| Total | 0 | 0 | 0 | 0 | 31.3 | 0 |
| Total Blended | 279.4 | 279.4 | 279.4 | 279.4 | 309.2 | 279.4 |
| SECOND COATING | ml | ml | ml | ml | g | ml |
| Component A | | | | | | |
| CA8800/B70846 | 100 | | 100 | | | |
| CA9311/F36173 | | 150 | | 150 | | 150 |
| Joncryl 500 | | | | | 72.1 | |
| n-Butyl acetate | | | | | 10.0 | |
| n-methyl amyl ketone | | | | | 10.0 | |
| Gasil IJ35 | | | | | 4.9 | |
| Hybricor 204 | | | | | 20.0 | |

TABLE 12-continued

Multilayer Coating (inhibited first coating + inhibited second coating)

| | | | | | | |
|---|---|---|---|---|---|---|
| Bayferrox 3920 | | | | | 2.6 | |
| Lithium ortho-silicate | | | | | 5.0 | |
| Blanc-Fix (Micro) | | | | | 13.1 | |
| Ti-Pure R-706-11 | | | | | 49.5 | |
| Total Component B | 100 | 150 | 100 | 150 | 187.2 | 150 |
| CA8800Z | 50 | | 50 | | | |
| CA9300 | | 50 | | 50 | | 50 |
| 3-MPTMS | | | | | 4.0 | |
| DBTDL Solution | | | | | 0.8 | |
| Xylene | | | | | 17.4 | |
| Desmodur N 3300 | | | | | 42.3 | |
| Total Component C | 50 | 50 | 50 | 50 | 64.5 | 50 |
| CA8800CT | 50 | | 50 | | | |
| Acetone | | 20 | | 20 | | 20 |
| Xylene | | | | | 9.0 | |
| Methyl n-propyl ketone | | | | | 9.0 | |
| n-Butyl Acetate | | | | | 6.9 | |
| Hybricor 204 | 18(g) | 18(g) | 18(g) | 18(g) | | 18(g) |
| Total | ~68 | ~38 | ~68 | ~38 | 24.9 | ~38 |
| Total Blended | ~218 | ~238 | ~218 | ~238 | 276.6 | ~238 |

Coating Examples 18 to 23 were prepared as follows:

First Coating:

For Examples 18, 19, 20 and 21, all materials for Component A were weighed into suitable containers and mixed thoroughly using an air motor and mixing blade. For Example 22 and 23, all materials for Component A were weighed and placed into glass jars. Dispersing media was then added to each jar at a level equal to approximately half the total weight of the component materials. The jars were sealed with a lid and then placed on a Lau Dispersing Unit with a dispersion time of 3.0 hours. For Examples 18, 19, 20, 21 and 23, all materials for Component B with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 3.0 hours. Following the 3.0 hours of dispersion time for Component B of Examples 18 and 19, an additional amount of media was added to each jar at a level approximately equal to the total weight of the component materials. The jars were sealed with lids and then placed on a Lau Dispersiong Unit for an additional hour of dispersion time. All dispersions had Hegman gauge readings greater than 7. The Silquest A-187 was added to the Component B mixtures after the pigment dispersion process was completed. Each final Component B mixture was then thoroughly mixed. For Example 22, all materials for Component B with the exception of the Silquest A-187, OK-412 silica, and acetone were weighed and placed into a glass jar. Dispersion media was then added to the jar at a level equal to approximately twice the total weight of the component materials. The jar was sealed with a lid and then placed on a Lau Dispersing Unit with a dispersion time of approximately 3 hours. After the approximate 3 hour dispersion process, the OK-412 and acetone were added to the jar and placed back onto the Lau Dispersing Unit for approximately 5 minutes. The Silquest A-187 was then added to the Component B mixture after the pigment dispersion process was completed. The final Component B mixture was then thoroughly mixed.

Prior to coating application, the corresponding ratios of each total Component A, total Component B and total Component C shown in TABLE 12 were blended together, thoroughly mixed and given an induction time between 30 and 60 minutes prior to application. The First Coatings of Examples 18-23 were spray applied onto 2024T3 aluminum alloy substrate panels to a dry film thickness of between 0.7 to 1.3 mils using an air atomized spray gun. Prior to coating application, the aluminum alloy substrate panels were prepared in the same manner as described for examples 1-4. Following application of the First Coating for each Example, the coated panels were stored under ambient conditions for 12 to 24 hours before application of the Second Coating of each Example.

Second Coating:

For Examples 18 through 23 the corresponding amounts of Component C materials shown in Table 12 for each Example were added to suitably sized containers and mixed thoroughly using an air motor and mixing blade. For Examples 18, 19, 20, 21 and 23 the corresponding amounts of Component A and Component B shown in Table 12 for each Example were added to suitably sized containers and mixed thoroughly using an air motor and mixing blade. The corresponding amount of Component C shown in Table 12 for each Example (18, 19, 20, 21 and 23) was then added to the corresponding blended A and B components for each Example to produce each final blended second coating example. For Example 22, all materials for Component A were weighed and placed into a glass jar. Dispersing media was then added to the jar at a level equal to approximately twice the total weight of the component materials. The jar was sealed with a lid and then placed on a Lau Dispersing Unit with a dispersion time of 3.0 hours. For Components B of Example 22, all materials were weighed into a suitable container and mixed thoroughly using an air motor and mixing blade. The total amount of Components A, B and C shown in Table 12 for Example 22 were then added to a suitably sized container and then mixed thoroughly with an air motor stirrer and mixing blade to produce the final blended second coating example.

Once the Second Coatings for Examples 18 through 23 were thoroughly mixed, they were spray applied onto the panels previously coated with the First Coatings of Examples 18 through 23 in a manner where each Second Coating Example was applied over the corresponding First Coating Example (i.e. Second Coating Example 20 was applied over First Coating Example 20). Dry film thickness for the Second Coatings ranged from approximately 1.5 mils to 2.5 mils. Application of each Second Coating was performed between 10 minutes and 60 minutes after the initial mixing of each final Second Coating.

The fully coated test panels coated with coating Examples 18-23 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 13 were at 1176 hours of exposure for Examples 18, 19, 20, 21 and 23; and 1104 hours for Example 22. The panels were rated according to the same rating scale used for Examples 1-4.

TABLE 13

Corrosion Test Results for Examples 18-23

| Example # | Description | Scribe Corr. | Scribe Shine | Scribe Blisters | Face Blisters | Max. Scribe Blister Size |
|---|---|---|---|---|---|---|
| 18 | First Coating-1.2% lithium via lithium orthosilicate<br>Second Coating- PU + Azole (Hybricor) | 20 | 85 | 3 | 0 | <1.25 mm |
| 19 | First Coating-1.2% lithium via lithium orthosilicate<br>Second Coating- PU AP + Azole (Hybricor) | 5 | 70 | 2 | 0 | <1.25 mm |
| 20 | First Coating-1.2% lithium via lithium orthosilicate + 10% MgO<br>Second Coating PU + azole (Hybricor) | 25 | 90 | 4 | 0 | <1.25 mm |
| 21 | First Coating-1.2% lithium via lithium orthosilicate + 10% MgO<br>Second Coating- PU AP + azole (Hybricor) | 5 | 70 | 3 | 0 | <1.25 mm |
| 22 | First Coating- no lithium + 60% MgO<br>Second Coating- PU + 1.2% lithium via lithium orthosilicate + Azole (Hybricor) | 5 | 70 | 1 | 0 | <1.25 mm |
| 23 | First Coating - no LioSi + 35% MgO<br>Second Coating - PU AP + Azole (Hybricor) | 10 | 70 | 5 | 0 | <1.25 mm |

The corrosion data in TABLE 13 clearly shows that the multilayer coatings of all six examples provided good corrosion resistance when both the First Coating and Second coating comprised at least one corrosion inhibitor selected from a lithium compound, magnesium oxide, and an azole. Good corrosion resistance being evidenced by minimal blistering along the scribe edge and in some cases, minimal corrosion product in the scribe.

TABLE 14

Multilayer Coating (inhibited first coating + inhibited second coating) - various azoles & lithium sources

| Material FIRST COATING | Ex 24-27 g | Ex 28 g |
|---|---|---|
| Component A | | |
| Ancamide 2569 | 20.8 | 20.8 |
| Ancamine 2432 | 13.8 | 13.8 |
| Ancamine K-54 | 1.3 | 1.3 |
| N-butyl alcohol | 29.3 | 29.3 |
| Xylene | 6.3 | 6.3 |
| Total | 71.5 | 71.5 |
| Component B | | |
| Epon 828 | 65.8 | 65.8 |
| Xylene | 3.4 | 3.4 |
| Oxsol 100 | 38.3 | 38.3 |
| Silquest A-187 | 1.6 | 1.6 |
| Ti-Pure R-706-11 | 60.0 | 58.0 |
| Nano-magnesium oxide | 10.0 | 10.0 |
| Lithium orthosilicate | 5.0 | |
| Lithium carbonate | | 7.0 |
| CA1800X | 23.8 | 23.8 |
| Total | 207.9 | 207.9 |
| Total Blended | 279.4 | 279.4 |

| Material SECOND COATING | Ex 24 g | Ex 25 g | Ex 26 g | Ex 27 g | Ex 28 ml |
|---|---|---|---|---|---|
| Component A | | | | | |
| CA9311/F36173 | 70.2 | 70.2 | 70.2 | 70.2 | 75.0 |
| Total | 70.2 | 70.2 | 70.2 | 70.2 | 75.0 |
| Component B | | | | | |
| CA9300 | 19.3 | 19.3 | 19.3 | 19.3 | 25.0 |
| Total | 19.3 | 19.3 | 19.3 | 19.3 | 25.0 |
| Component C | | | | | |
| Acetone | 10.0 | 10.0 | 10.0 | 10.0 | 10.0 |
| Hybricor 204 | | | | | 9.0(g) |
| Mercaptobenzothiazole | 2.2 | | | | |
| Dimercaptothiadiazole | | 2.2 | | | |

TABLE 14-continued

Multilayer Coating (inhibited first coating + inhibited second coating) - various azoles & lithium sources

| | | | | | |
|---|---|---|---|---|---|
| Benzotriazole | | | 2.2 | | |
| Sodium Mercaptobenzothiazole | | | | 2.2 | |
| Total | 12.2 | 12.2 | 12.2 | 12.2 | ~19 |
| Total Blended | 101.7 | 101.7 | 101.7 | 101.7 | ~119 |

Coating Examples 24-28 were prepared as follows:

First Coating:

For Examples 24 to 28, all materials for Component A were weighed into suitable containers and mixed thoroughly using an air motor and mixing blade. All materials for Component B with the exception of the Silquest A-187 were weighed and placed into glass jars. Dispersing media was then added to each jar at a level equal to approximately twice the total weight of the component materials. The jars were sealed with lids and then placed on a Lau Dispersing Unit with a dispersion time of 3.0 hours. All dispersions had Hegman gauge readings greater than 7. The Silquest A-187 was added to the Component B mixtures after the pigment dispersion process was completed. Each final Component B mixture was then thoroughly mixed.

Prior to coating application, the corresponding ratios of each total Component A, total Component B and total Component C shown in TABLE 14 were blended together, thoroughly mixed and given an induction time between 30 and 60 minutes prior to application. The First Coatings of Examples 24-28 were spray applied onto 2024T3 aluminum alloy substrate panels to a dry film thickness of between 0.5 to 1.3 mils using an air atomized spray gun. Prior to coating application, the aluminum alloy substrate panels were prepared in the same manner as described for examples 1-4. Following application of the First Coating for each Example, the coated panels were stored under ambient conditions for 12 to 24 hours before application of the Second Coating of each Example.

Second Coating:

For Examples 24 to 28 the corresponding amounts of the Component C materials shown in Table 14 for each Example were added to suitably sized containers and mixed thoroughly using an air motor and mixing blade. Prior to application of each second coating, the corresponding total amounts shown in Table 14 for each Component A, Component B, and Component C of each second coating example were then placed into suitably sized containers and then mixed thoroughly with an air motor stirrer and mixing blade to produce each final blended second coating example.

Once the Second Coatings for Examples 24 through 28 were thoroughly mixed, they were spray applied onto the panels previously coated with the First Coatings of Examples 24 through 28 in a manner where each Second Coating Example was applied over the corresponding First Coating Example (i.e. Second Coating Example 24 was applied over First Coating Example 24). Dry film thickness for the Second Coatings ranged from approximately 1.5 mils to 2.5 mils. Application of each Second Coating was performed between 10 minutes and 60 minutes after the initial mixing of each Second Coating.

The fully coated test panels coated with coating Examples 24-28 were allowed to age under ambient conditions for a minimum of 7 days, after which the panels were inscribed with a 10 cm by 10 cm "X" that was scribed into the panel surface to a sufficient depth to penetrate any surface coating and to expose the underlying metal. The scribed coated test panels were then placed into a 5% sodium chloride neutral salt spray cabinet according to ASTM B117 (exception: pH & salt concentration checked weekly as opposed to daily).

The ratings shown in TABLE 15 were at 1152 hours of exposure. The panels were rated according to the same rating scale used for Examples 1-4.

TABLE 15

Corrosion Test Results for Examples 24-28

| Example # | Description | Scribe Corr. | Scribe Shine | Scribe Blisters | Face Blisters | Max. Scribe Blister Size |
|---|---|---|---|---|---|---|
| 24 | First Coating-1.2% lithium via lithium orthosilicate + 10% MgO Second Coating PU AP + azole (MBT) | 5 | 40 | 0 | 0 | 0 |
| 25 | First Coating-1.2% lithium via lithium orthosilicate + 10% MgO Second Coating- PU AP + azole (DMTD) | 5 | 50 | 0 | 0 | 0 |
| 26 | First Coating- 1.2% lithium via lithium orthosilicate + 10% MgO Second Coating- PU AP + azole (BZT) | 10 | 50 | 0 | 0 | 0 |
| 27 | First Coating- 1.2% lithium via lithium orthosilicate + 10% MgO Second Coating - PU AP + azole (NaMBT) | 5 | 30 | 0 | 0 | 0 |

TABLE 15-continued

Corrosion Test Results for Examples 24-28

| Example # | Description | Scribe Corr. | Scribe Shine | Scribe Blisters | Face Blisters | Max. Scribe Blister Size |
|---|---|---|---|---|---|---|
| 28 | First Coating - 1.3% lithium via lithium carbonate + 10% MgO Second Coating- PU AP + Azole (Hybricor) | 10 | 30 | 0 | 0 | 0 |

The corrosion data in TABLE 15 clearly shows that the multilayer coatings of all five examples provided good corrosion resistance when both the First Coating and Second coating comprised at least one corrosion inhibitor selected from a lithium compound, magnesium oxide, and an azole. Good corrosion resistance being evidenced by no blistering along the scribe edge and minimal corrosion product in the scribe.

Addition of the claimed inhibitors of the invention to a coating provide improved corrosion resistance when compared to the same coatings without inhibitor, regardless of whether the coating is used as a single layer or if a second coating is applied over the first layer. However, application of an uninhibited topcoat over an inhibited first layer containing the corrosion inhibitors of the invention results in some suppression of corrosion inhibition. Incorporating

TABLE 16

Key Comparisons in Corrosion Resistance (Summary)

| Example # | Description | Scribe Corr. | Scribe Shine | Scribe Blisters | Face Blisters | Max. Scribe Blister Size |
|---|---|---|---|---|---|---|
| Comp. 1 | Single Coating: No inhibitor | 25 | 95 | >30 | 0 | >1.25 mm |
| 2 | Single Coating: 1.2% lithium (via silicate) | 15 | 80 | 0 | 0 | 0 |

➢Addition of the lithium silicate to a single coating significantly improved corrosion resistance.

| 15 | First Coating-1.2% lithium (via silicate) Second Coating- PU AP-no inhibitor | 25 | 85 | 4 | 0 | <1.25 mm |

➢Application of an uninhibited second coating over the first lithium inhibited coating produced a multilayer coating with corrosion resistance that was also improved vs. the single coating with no inhibitor
➢However, application of the uninhibited topcoat suppressed some of the corrosion inhibiting benefits of the first (i.e. single) coating.

| 19 | First Coating-1.2% lithium (via silicate) Second Coating- PU AP + Azole (Hybricor) | 5 | 70 | 2 | 0 | <1.25 mm |

➢Incorporation of azole inhibitor into the second coating (applied over the First lithium inhibited coating) overcame the suppression of corrosion inhibiting benefits observed when an uninhibited second coating was applied over the First coating.

TABLE 17

Key Comparisons in Corrosion Resistance (Summary)

| Example # | Description | Scribe Corr. | Scribe Shine | Scribe Blisters | Face Blisters | Max. Scribe Blister Size |
|---|---|---|---|---|---|---|
| Comp. 1 | Single Coating: No inhibitor | 25 | 95 | >30 | 0 | >1.25 mm |
| 8 | 1.2% lithium (via silicate) & 10% MgO | 5 | 80 | 0 | 0 | 0 |

➢Addition of MgO and lithium silicate to a single coating significantly improved corrosion resistance.

| 17 | First Coating-1.2% lithium (via silicate) & 10% MgO Second Coating- PU AP-no inhibitor | 25 | 85 | 5 | 0 | <1.25 mm |

➢Application of an uninhibited second coating over the first lithium and MgO inhibited coating produced a multilayer coating with corrosion resistance that was also improved vs. the single coating with no inhibitor
➢However, application of the uninhibited topcoat suppressed some of the corrosion inhibiting benefits of the first (i.e. single) coating.

| 21 | First Coating-1.2% lithium (via silicate) + 10% MgO Second Coating- PU AP + azole (Hybricor) | 5 | 70 | 3 | 0 | <1.25 mm |

➢Incorporation of azole inhibitor into the second coating (applied over the First lithium and MgO inhibited coating) overcame the suppression of corrosion inhibiting benefits observed when an uninhibited second coating was applied over the First coating.

corrosion inhibitor into both the first coating and the second coating of a multilayer coating system allows for corrosion resistance to be similar to that of the single inhibited layer.

We claim:

1. A curable film-forming composition comprising:
(1) a thermosetting, organic film-forming binder component comprising: (a) a resin component comprising a diglycidyl ether of Bisphenol A; and (b) a curing agent component comprising a polyamine and a polyamide, wherein the curing agent is present in an amount of 33 to 46 percent by weight, based on the total weight of resin solids in the composition; and
(2) a corrosion inhibiting component comprising a lithium silicate, present in the curable film-forming composition in an amount of 0.8 to 3.5 percent lithium by weight, based on the total weight of resin solids in the curable film-forming composition,
wherein the lithium silicate comprises lithium orthosilicate and/or lithium metasilicate.

2. The composition of claim 1 wherein the corrosion inhibiting component (2) further comprises magnesium oxide and/or an azole.

3. The composition of claim 1, wherein the curable film-forming composition is a primer composition.

4. The composition of claim 1, wherein the lithium orthosilicate is present.

5. The composition of claim 1, wherein the composition is a solventborne composition.

6. A metal substrate at least partially coated with a curable film-forming composition, wherein the curable film-forming composition comprises:
(1) a thermosetting, organic film-forming binder component comprising: (a) a resin component comprising a diglycidyl ether of Bisphenol A; and (b) a curing agent component comprising a polyamine and a polyamide, wherein the curing agent is present in an amount of 33 to 46 percent by weight, based on the total weight of resin solids in the composition; and
(2) a corrosion inhibiting component comprising a lithium silicate, present in the curable film-forming composition in an amount of 0.8 to 3.5 percent lithium by weight, based on the total weight of resin solids in the curable film-forming composition,
wherein the lithium silicate comprises lithium orthosilicate and/or lithium metasilicate.

7. The coated metal substrate of claim 6, wherein the curable film-forming composition is applied directly to the metal substrate and there is no intermediate coating between the substrate and the curable film-forming composition.

8. The coated metal substrate of claim 6, wherein the metal substrate comprises aluminum.

9. The coated metal substrate of claim 6, wherein the metal substrate is an aircraft part.

10. The coated metal substrate of claim 6, further comprising an additional coating layer applied on top of at least a portion of the curable film-forming composition.

11. The coated metal substrate of claim 10, wherein the additional coating layer comprises a fluoropolymer and/or a polyurethane polymer.

12. The coated metal substrate of claim 10, wherein the additional coating layer comprises a corrosion inhibiting component comprising a lithium silicate, magnesium oxide and/or an azole.

13. A multilayer coated metal substrate comprising:
(a) a metal substrate;
(b) a curable film-forming composition applied to said metal substrate, wherein the curable film-forming composition comprises:
(1) a thermosetting, organic film-forming binder component comprising: (a) a resin component comprising a diglycidyl ether of Bisphenol A; and (b) a curing agent component comprising a polyamine and a polyamide, wherein the curing agent is present in an amount of 33 to 46 percent by weight, based on the total weight of resin solids in the composition; and
(2) a corrosion inhibiting component comprising a lithium silicate, present in the curable film-forming composition in an amount of 0.8 to 3.5 percent lithium by weight, based on the total weight of resin solids in the curable film-forming composition; and
(c) an additional coating layer applied on top of at least a portion of the curable film-forming composition,
wherein the lithium silicate comprises lithium orthosilicate and/or lithium metasilicate.

14. The multilayer coated metal substrate of claim 13, wherein the metal substrate (a) comprises aluminum.

15. The multilayer coated metal substrate of claim 14, wherein the metal substrate (a) is an aircraft part.

16. The multilayer coated metal substrate of claim 13, wherein the curable film-forming composition (b) is applied directly to the metal substrate and there is no intermediate coating between the substrate and the curable film-forming composition.

17. The multilayer coated metal substrate of claim 13, wherein the corrosion inhibiting component (2) further comprises magnesium oxide an/or an azole.

18. The multilayer coated metal substrate of claim 13, wherein the additional coating layer (c) comprises a corrosion inhibiting component comprising a lithium silicate, magnesium oxide, and/or an azole.

19. The multilayer coated metal substrate of claim 13, wherein the additional coating layer (c) comprises a fluoropolymer and/or a polyurethane polymer.

20. A multilayer coated metal substrate comprising:
(a) a metal substrate;
(b) a first curable film-forming composition applied to said metal substrate, wherein the first curable film-forming composition comprises:
(1) a curable, organic film-forming binder component; and
(2) a corrosion inhibiting component; and
(c) a second curable film-forming composition applied on top of at least a portion of the first curable film-forming composition; wherein the second curable film-forming composition comprises:
(1) a curable, organic film-forming binder component that is the same as or different from the curable, organic film-forming binder component in the first curable film-forming composition; and
(2) a corrosion inhibiting component that is the same as or different from the corrosion inhibiting component in the first curable film-forming composition; and wherein the corrosion inhibiting component (2) in each of the first and second curable film-forming compositions independently comprises (i) a lithium compound comprising lithium silicate and/or a lithium salt; (ii) magnesium oxide and/or (iii) an azole, and at least one of the first curable film-forming composition and second curable film-forming composition comprises the curable film-forming composition of claim 1.

21. The multilayer coated metal substrate of claim 20, wherein each of the lithium compound, magnesium oxide, and azole are present.

22. The multilayer coated metal substrate of claim 20, further comprising (d) an additional film-forming composition applied on top of at least a portion of the second curable film-forming composition (c).

* * * * *